(12) United States Patent
DiFalco et al.

(10) Patent No.: US 7,765,460 B2
(45) Date of Patent: *Jul. 27, 2010

(54) OUT-OF-BAND CHANGE DETECTION

(75) Inventors: Robert A. DiFalco, Portland, OR (US);
Kenneth L. Keeler, Lake Oswego, OR (US); Robert L. Warmack, West Linn, OR (US)

(73) Assignee: Tripwire, Inc., Portland, OR (US)

( * ) Notice: Subject to any disclaimer, the term of this patent is extended or adjusted under 35 U.S.C. 154(b) by 1272 days.

This patent is subject to a terminal disclaimer.

(21) Appl. No.: 11/171,096

(22) Filed: Jun. 29, 2005

(65) Prior Publication Data

US 2007/0022365 A1    Jan. 25, 2007

(51) Int. Cl.
*H04L 1/00* (2006.01)
(52) U.S. Cl. .................... 714/799; 714/758; 714/41
(58) Field of Classification Search ............ 714/758, 714/799, 805, 818, 819
See application file for complete search history.

(56) References Cited

U.S. PATENT DOCUMENTS

| | | | |
|---|---|---|---|
| 5,878,408 A * | 3/1999 | Van Huben et al. ............ 707/1 |
| 6,041,347 A * | 3/2000 | Harsham et al. ............ 709/220 |
| 6,535,512 B1 | 3/2003 | Daniel | |
| 6,742,114 B1 * | 5/2004 | Carter et al. .............. 713/156 |
| 7,058,861 B1 * | 6/2006 | Adams ..................... 714/47 |
| 7,065,767 B2 * | 6/2006 | Kambhammettu et al. .. 719/310 |
| 2004/0006614 A1 | 1/2004 | DiFalco | |
| 2004/0059930 A1 | 3/2004 | DiFalco et al. | |
| 2004/0060046 A1 | 3/2004 | Good et al. | |
| 2004/0122962 A1 | 6/2004 | DiFalco et al. | |
| 2004/0123133 A1 | 6/2004 | DiFalco et al. | |

* cited by examiner

*Primary Examiner*—Esaw T Abraham
(74) *Attorney, Agent, or Firm*—Schwabe Williamson & Wyatt

(57) ABSTRACT

An automated method for facilitating management of a data processing environment is disclosed. In various embodiments, the method may include facilitating creation of a first memorialization, in digital form, of one or more changes detected on a data processing device of the data processing environment. In various embodiments, the method may further included facilitating comparison of the first memorialization to a second memorialization of one or more in-band changes that should have been made to the data processing device to facilitate detection of one or more out-of-band changes to the data processing device. Other embodiments of the present invention may include, but are not limited to, apparatus adapted to facilitate practice of the above-described method.

37 Claims, 4 Drawing Sheets

OUT-OF-BAND CHANGE DETECTION

FIELD

Disclosed embodiments of the present invention relate generally to the field of data processing, and more particularly to out-of-band change detection in data processing environments.

BACKGROUND

Data processing devices are deployed in many different configurations and are used for many different applications in a variety of data processing environments. Management of a data processing environment may be performed in a number of nonexclusive ways. In some configurations, data processing devices may be grouped and/or inter-related for various reasons. For example, software on one or a group of computers may be designated to be updated with an improved version of the software. Similar situations may arise among a wide variety of data processing devices, including but not limited to switches, routers, and other networking devices of the like.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION OF ILLUSTRATIVE EMBODIMENTS

Figure 1:
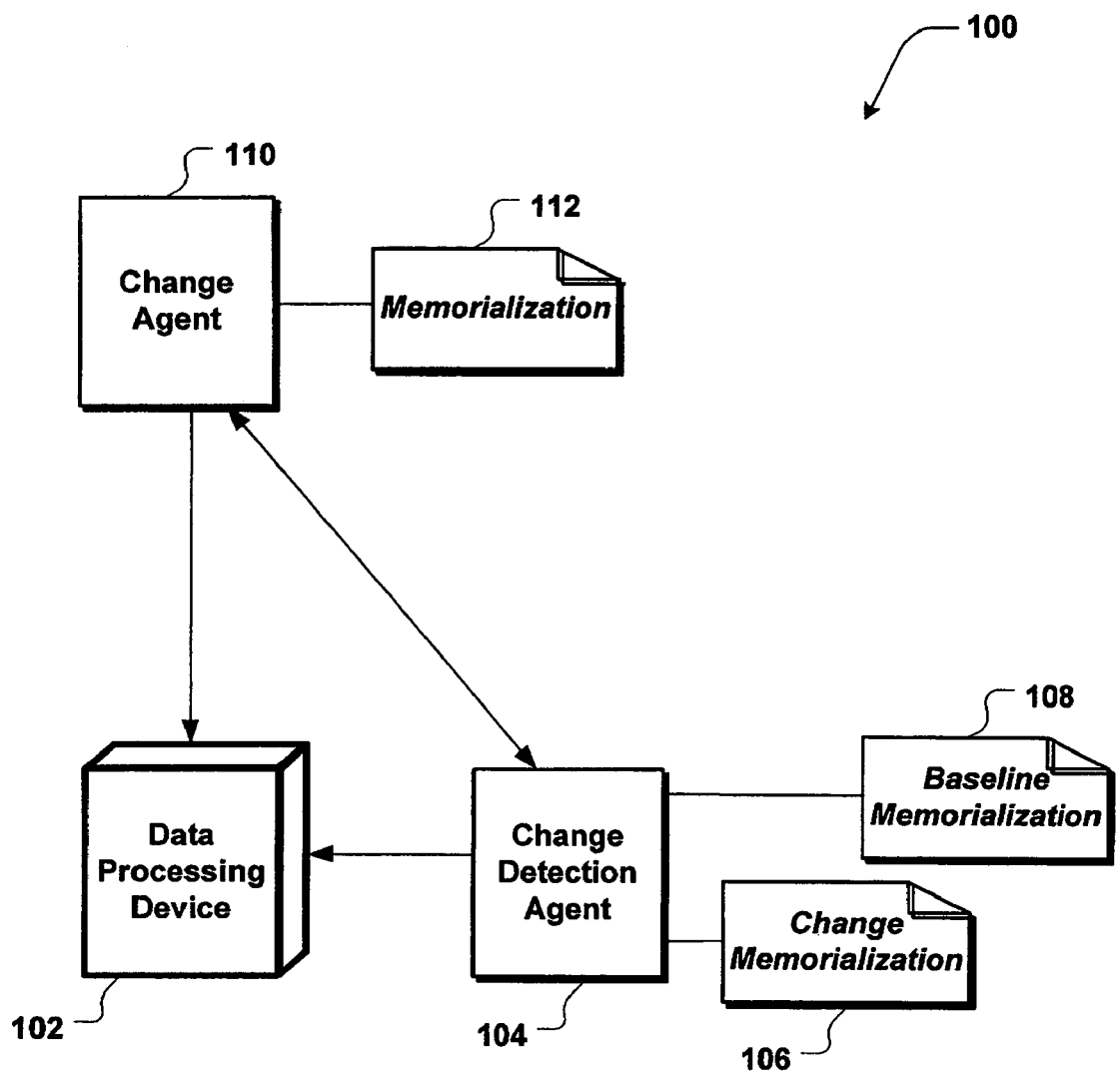
FIG. 1 illustrates some aspects of a data processing environment, in accordance with various embodiments of this invention.

Embodiments of the present invention include, but are not limited to, an automated method for facilitating management of a data processing environment. In various embodiments, the method may include facilitating creation of a first memorialization, in digital form, of one or more changes detected on a data processing device of the data processing environment. In various embodiments, the method may further included facilitating comparison of the first memorialization to a second memorialization of one or more in-band changes that should have been made to the data processing device to facilitate detection of one or more out-of-band changes to the data processing device. Other embodiments of the present invention may include, but are not limited to, apparatus adapted to facilitate practice of the above-described method. While portions of the following discussion are primarily presented in the context of computers, it is understood that the principles described herein may apply to other data processing devices, including but not limited switches, routers, and other networking equipment of the like.

In the following description, various aspects of embodiments of the present invention will be described. However, it will be apparent to those skilled in the art that other embodiments may be practiced with only some or all of the described aspects. For purposes of explanation, specific numbers, materials and configurations are set forth in order to provide a thorough understanding of the embodiments. However, it will be apparent to one skilled in the art that other embodiments may be practiced without the specific details. In other instances, well-known features are omitted or simplified in order not to obscure the description.

Parts of the descriptions of various embodiments will be presented in terms of operations performed by a processor-based device, using terms such as data and the like, consistent with the manner commonly employed by those skilled in the art to convey the substance of their work to others skilled in the art. As well understood by those skilled in the art, the quantities may take the form of electrical, magnetic, or optical signals capable of being stored, transferred, combined, and otherwise manipulated through mechanical and electrical components of the processor-based device; and the term processor includes microprocessors, micro-controllers, digital signal processors, and the like, that are standalone, adjunct or embedded.

Various operations will be described as multiple discrete operations in turn, in a manner that is most helpful in understanding the embodiments, however, the order of description should not be construed as to imply that these operations are necessarily order dependent. In particular, these operations need not be performed in the order of presentation.

The phrase "in some embodiments" is used repeatedly. The phrase does not generally refer to the same group of embodiments, however, it may. The phrase "in various embodiments" is used repeatedly. The phrase does not generally refer to the same group of embodiments, however, it may. The terms "comprising," "having" and "including" are synonymous, unless the context dictates otherwise.

Some embodiments of the present invention include a scalable architecture to facilitate detection of one or more out-of-band changes to data processing devices. Such data processing devices may include but are not limited to networking devices, servers, desktop computers, laptop computers, tablet computers, personal digital assistants, cellular phones, set top boxes, media players, or other types of data processing devices. In some embodiments, a data processing environment may comprise a continuously or intermittently connected environment of data processing devices, including data processing devices communicating through the Internet. In some embodiments, a data processing environment may comprise a directly or indirectly connected environment of data processing devices, including data processing devices communicating through the Internet. In various embodiments, one or more modules may facilitate the operations described herein.

FIG. 1 illustrates some aspects of data processing environment 100, in accordance with various embodiments of this invention. Data processing environment 100 may include data processing device 102. Data processing environment 100 may include other data processing devices of one or more types. In various embodiments, data processing device 102 may comprise a computer, such as a server or a desktop computer. In various embodiments, data processing device 102 may comprise another type of data processing device, such as, a networking device (a router, a switch, a gateway, or the like), a laptop computer, a tablet computer, a personal data assistant, a cellular phone, a set top box, a media player, or the like.

Illustrating a portion of a possible operational context in some embodiments, change detection agent 104 may facilitate creation, in digital form, of change memorialization 106 of one or more changes detected on data processing device 102 of data processing environment 100. In various embodiments, change memorialization 106 may comprise a file. In various embodiments, change memorialization 106 may comprise a different type of digital memorialization. In various embodiments, change detection agent 104 may facilitate creation of change memorialization 106 by facilitating automated comparison of a first state (not shown) of data processing device 102 to a second state (not shown) of data processing device 102. In some embodiments in which change memorialization 106 comprises a file, automated comparison of a first state of data processing device 102 to a second state of data processing device 102 may be performed to facilitate creation of a first file (illustrated as change memorialization 106 in such embodiments) of first one or more records (not shown) of the one or more detected changes to data processing device 102. In some embodiments, the second state may comprise a current baseline state, with FIG. 1 illustrating some such embodiments with baseline memorialization 108 representing a current baseline state of data processing device 102. In some embodiments, the second state may represent a state other than a current baseline state. In some embodiments, change detection agent 104 may facilitate obtaining the first state of data processing device 102.

Illustrating a portion of a possible operational context in some embodiments, change agent 110 may facilitate making a change to data processing device 102. After facilitating making a change to data processing device 102, change agent 110 may make a memorialization of the change, illustrated in the exemplar in FIG. 1 as memorialization 112. In various embodiments, memorialization 112 may comprise a memorialization of one change made to data processing device 102. In various other embodiments, memorialization 112 may comprise a memorialization of multiple changes made to data processing device 102. In various embodiments, memorialization 112 may include any sort of information regarding the change(s) made, such as the time the change(s) occurred. In some embodiments, change agent 110 may comprise a software distribution tool or updating agent that installs software on data processing device 102. In some such embodiments, memorialization 112 may comprise a manifest of software that has been installed on data processing device 102. In some embodiments, such a software distribution tool or updating agent may install software on any number of data processing devices. In various embodiments, change agent 110 may comprise any sort of change agent, including but not limited to, a data change agent, an access rights management agent (such as, for example, an identity access management tool), or the like.

In various embodiments, memorialization 112 may comprise a file. In some such embodiments, memorialization 112 may comprise a second file of second one or more records (not shown) of one or more in-band changes that should have been made to data processing device 102. In-band changes refer to changes that are in-band to change agent 110, meaning within change agent's (110) knowledge base. Changes that are in-band to change agent 110 may have at least partially been caused by change agent 110, or may have otherwise been added to change agent's (110) knowledge base. In various embodiments, memorialization 112 may comprise a memorialization other than a file.

In some embodiments, change detection agent 104 may facilitate comparison of change memorialization 106 to memorialization 112. In some embodiments, before change detection agent 104 facilitates such a comparison, a change to data processing device 102 may have been detected by change detection agent 104. Memorialization 112 may comprise one or more in-band changes that should have been made to data processing device 102. Change detection agent 104 may facilitate comparison of change memorialization 106 to memorialization 112 to facilitate detection of one or more out-of-band changes to data processing device 102. Out-of-band changes refer to changes that are out-of-band to change agent 110, meaning outside of change agent's (110) knowledge base. Changes that are out-of-band to change agent 110 may have at least partially been caused by something other than change agent 110, or may have otherwise not been added to change agent's (110) knowledge base. In various embodiments, facilitating detection of one or more out-of-band changes may comprise facilitating determination of a subset of changes of change memorialization 106 not included in memorialization 112. In various embodiments, change agent 110 may additionally or alternatively facilitate comparison/detection of change memorialization 106 to memorialization 112.

In various embodiments, said facilitating of comparison may comprise facilitating automated comparison of an indication of a change in change memorialization 106 to software (and/or data) of data processing device 102 to a corresponding indication of a change in memorialization 112 to software (and/or data) to data processing device 102. In some embodiments in which change memorialization 106 and memorialization 112 comprise files, said files may comprise records of changes. In some such embodiments, said facilitating comparison of change memorialization 106 to memorialization 112 may comprise facilitating automated comparison of change memorialization's (106) first one or more records to memorialization's (112) second one or more records. In various embodiments, said facilitating detection may comprise facilitating correlation of a first change to a software of data processing device 102 in change memorialization 106, to one of the one or more in-band changes in memorialization 112. In some embodiments, memorialization 112 may have been created by a vendor of the software. In some such embodiments, a vendor of the software may comprise a tool which provisioned the software. In various embodiments, said facilitating detection may comprise facilitating correlation of a first change to a data of data processing device 102 in change memorialization 106, to one of the one or more in-band changes in memorialization 112. In some embodiments, memorialization 112 may have been created by a vendor owner of the data. In some such embodiments, a vendor owner of the data may comprise a tool that stored the data on data processing device 102.

In various embodiments, said facilitating comparison may be performed to determine whether all of the in-band changes contained in memorialization 112 have indeed been made to data processing device 102. In some such embodiments, a further operation may comprise updating a baseline state (which may be represented by baseline memorialization 108 of FIG. 1) of data processing device 102 to include in-band changes that indeed have been made to the data processing device 102. As one illustrative embodiment in the case where change agent 110 represents a software distribution or updating agent, change detection agent 104 may facilitate comparison of memorialization 112 of software recently installed on data processing device 102 to the recent detected changes to software of data processing device 102, as contained in change memorialization 106. Another illustrative embodiment may further comprise an operation updating a baseline state (which may be represented by baseline memorialization 108 of FIG. 1) of data processing device 102 to include in-band software changes that indeed have been made to the data processing device 102.

In various embodiments, change detection agent 104 may facilitate definition in digital form of one or more responses to one or more detected out-of-band changes. In some embodiments, the one or more responses may include an automatic remediation or alert response to at least one of the one or more detected out-of-band changes. For example, in various embodiments, an automatic remediation response may comprise reverting the out-of-band changed component of data processing device 102 back to its baseline state. In various embodiments, an automatic alert response may comprise notifying a user, for example, a system administrator, of the one or more detected out-of-band changes. In various embodiments, an automatic alert response may comprise creating a helpdesk incident. In various other embodiments, other responses may comprise either automatic remediation or alert responses to one or more detected out-of-band changes.

In various embodiments, the one or more responses may include a no-action automatic approval response. For example, in some embodiments, a no-action automatic approval response may be applied in cases where certain acceptable changes, out-of-band to change agent 110, are known to arise on data processing device 102. In some such embodiments, such out-of-band changes may automatically be promoted to baseline memorialization 108 of data processing device 102 upon their detection. In various other embodiments, a no-action automatic approval response may be applied in other cases.

In various embodiments of data processing environment 100, the facilitating creation and the facilitating comparison may be first performed at a first point in time, with further operations repeating the facilitating creation and the facilitating comparison at least once, at a second later point in time. In some such embodiments, further operations may comprise scheduling the repeating of the facilitating creation and the facilitating comparison at the second later point in time.

Figure 2:
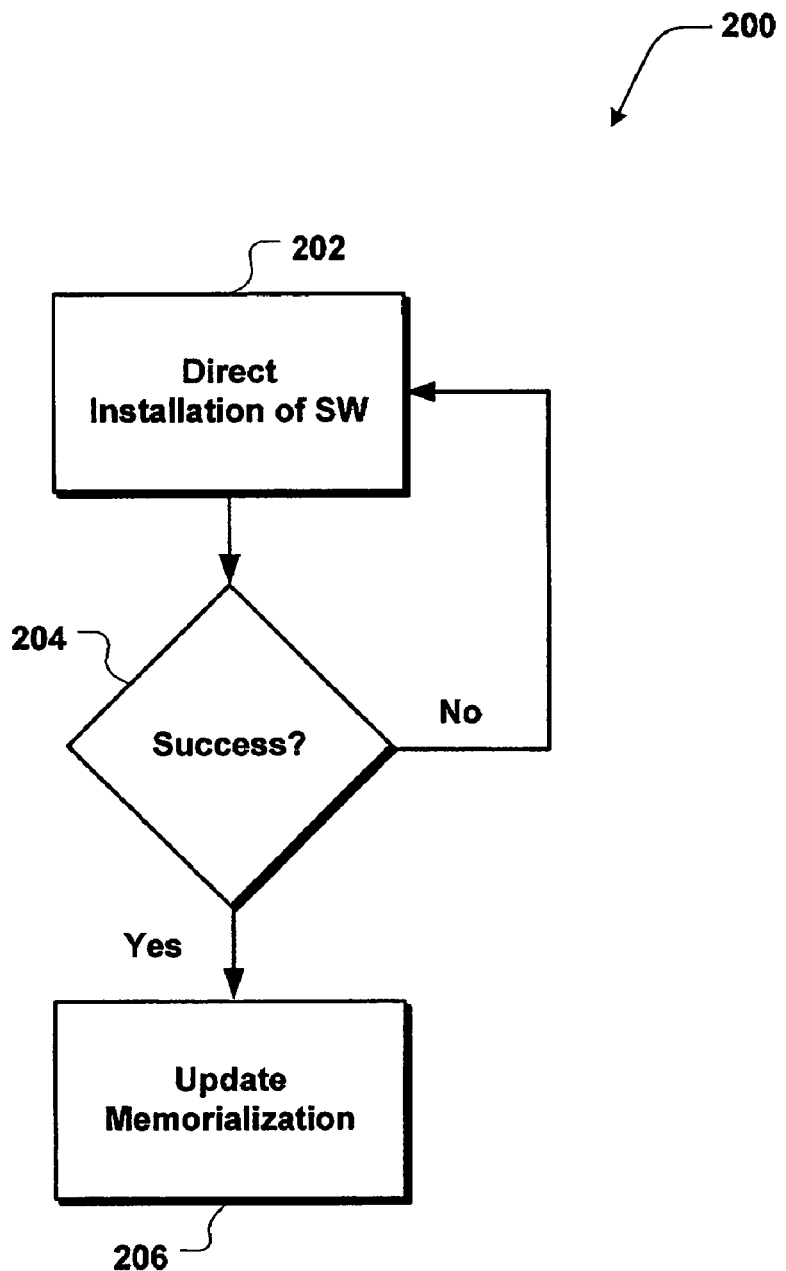
FIG. 2 illustrates parts of a change agent workflow, in accordance with various embodiments of this invention.

FIG. 2 illustrates parts of change agent workflow 200, in accordance with various embodiments of this invention. While certain operations are illustrated in FIG. 2, other operations may supplement or supplant the operations shown, in the context of various embodiments. Change agent workflow 200 illustrates parts of a workflow associated with some change agents, including operations that may be associated with one type of example change agent, a software distribution or updating agent. A software distribution or updating agent, which may be referred to in a number of ways, including a software distribution tool, a patch manager, etc., may include various operations. One such operation may include Direct Installation of Software 202, where a software distribution or updating agent may direct installation of software onto a data processing device. Such an operation may be followed by an operation determining success of such directed installation, denoted as diamond, Success? 204. If operation 204 is determined in the affirmative, then operation, Update Memorialization 206, may follow. If operation 204 is determined in the negative, then operation, Direct Installation of Software 204, may follow as a retry, either immediately, after a delay, at a future scheduled time, etc. The sophistication of operation 204 may vary widely, depending on the implementation. Some such operations may determine success based on a lack of notification of failure, while other such operations may determine success based on some affirmative operations.

Operation 204 may be followed by operation, Update Memorialization 206. Update Memorialization 206 may comprise updating a memorialization, which may be referred to as a manifest in some implementations, documenting the installation of the software. The documentation may include information regarding the software installed, such as the time the installation was directed. In various embodiments, some software distribution or updating agents may proceed directly from operation, Direct Installation of Software 202, to operation, Update Memorialization 206. In various embodiments, some software distribution or updating agents may additionally or alternatively include other operations.

Figure 3:
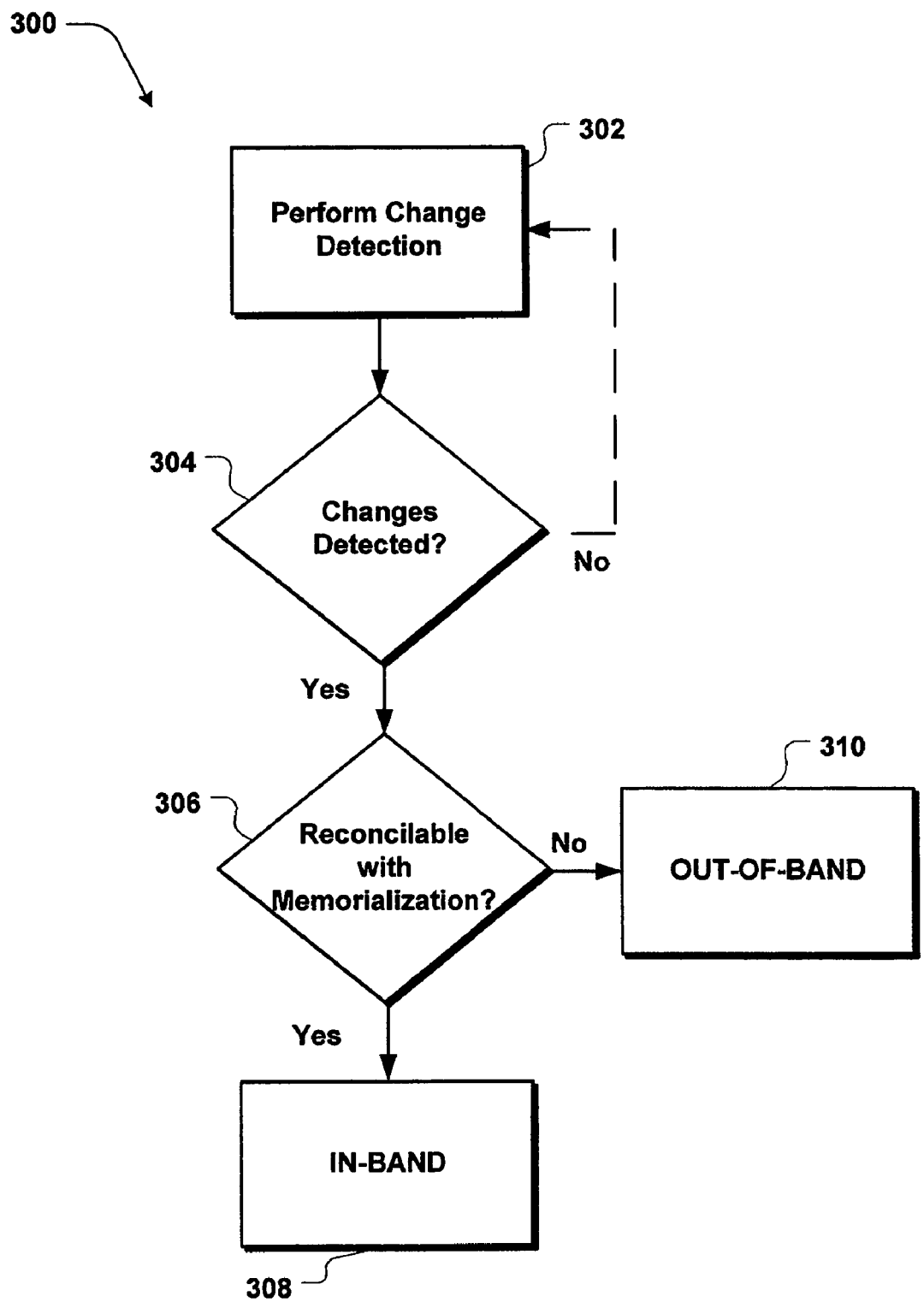
FIG. 3 illustrates parts of an out-of-band change detection workflow, in accordance with various embodiments of this invention.

FIG. 3 illustrates parts of an out-of-band change detection workflow 300, in accordance with various embodiments of this invention. While certain operations are illustrated in FIG. 3, other operations may supplement or supplant the operations shown, in the context of various embodiments. Out-of-band change detection workflow 300 may include various operations, including operation, Perform Change Detection 302, where a change detection agent may perform one or more change detection operations to a data processing device. Perform Change Detection 302 may be followed by an operation determining whether changes were detected as a result of performing the one or more change detection operations, denoted as diamond, Changes Detected? 304.

If operation 304 is determined in the affirmative, then operation, Reconcilable with Memorialization? 306, may follow in some embodiments. If operation 304 is determined in the negative, then operation, Perform Change Detection 302, may follow in some embodiments, either immediately, after a delay, at a future scheduled time, etc. In various other embodiments, operation 304 being determined in the negative may be followed by another operation (not shown) or may comprise an endpoint, either temporary or otherwise.

If Reconcilable with Memorialization? 306 is determined in the affirmative, then designation, IN-BAND 308, may follow in some embodiments. If operation 306 is determined in the negative, then designation, OUT-OF-BAND 310, may follow in some embodiments. In various other embodiments, operation 306 being determined in either the negative or the positive may be followed by various other operations (not shown). The sophistication of operation 306 may vary widely, depending on the implementation and the information available to make the reconciliation. The designation of IN-BAND 308 may be followed by various operations, including but not limited to, elevating the detected change(s) to a baseline state of the data processing device in issue. The designation of OUT-OF-BAND 310 may be followed by various operations, including but not limited to, alerting such a designation of a detected change.

In various embodiments, one or more of the operations illustrated in FIG. 3 may be automated/facilitated by one or more modules provided by the invention. In various embodiments, some change detection agents may additionally or alternatively include other operations.

In various embodiments, out-of-band change detection may be performed to maintain or demonstrate control of an enterprise's information technology infrastructure. In various embodiments, out-of-band change detection may be performed to maintain or demonstrate control of an enterprise's financial systems or data. In various embodiments, out-of-band change detection may be performed to maintain or demonstrate control of an enterprise's business processes, such as, for example, enterprise resource planning (ERP) or customer relationship management (CRM). In various embodiments, out-of-band change detection may be performed to facilitate compliance with governmental laws/regulations regarding establishment and maintenance of an internal control structure and/or procedures for financial reporting, such as, for example, the Sarbanes-Oxley Act (the Public Company Accounting Reform and Investor Protection Act), including any amendments and/or successor Acts to any part of the Sarbanes-Oxley Act, or the like.

In various embodiments, out-of-band change detection may be performed to facilitate compliance with a number of laws, regulations, or guidelines, including but not limited to, the Gramm Leach Bliley Act, the regulations of Food and Drug Administration 21 Code of Federal Regulations 11, the Health Insurance Portability & Accountability Act, the Visa Cardholder Information Security Plan, the National Credit Union Administration Guidelines, the Office of the Comptroller of the Currency Guidelines, or the like, including any amendments and/or successors to any of the above, or the like.

In various embodiments, out-of-band change detection may be performed as part of an audit of an enterprise, including but not limited to, a financial accounting or statement audit. In some such embodiments, out-of-band change detection may be performed to at least provide an audit trail for said audit.

In various embodiments where out-of-band change detection is performed to maintain or demonstrate control of an enterprise's information technology infrastructure, financial systems or data, or business processes, use of out-of-band change detection may occur in a number of areas, including but not limited to, access control, network security, auditing and monitoring of security-related events, or the like. In various embodiments where out-of-band change detection is performed to maintain or demonstrate control of an enterprise's information technology infrastructure, financial systems or data, or business processes, said maintenance or demonstration of control may include other aspects of an enterprise's information technology infrastructure, financial systems or data, or business processes, respectively.

In various embodiments where out-of-band change detection is performed as part of an audit of an enterprise, or to facilitate compliance with governmental laws/regulations, use of out-of-band change detection may occur in a number of areas, including but not limited to, access control, network security, auditing and monitoring of security-related events, or the like. In various other embodiments, where out-of-band change detection is performed as part of an audit of an enterprise, or to facilitate compliance with governmental laws/regulations, use of out-of-band change detection may include other aspects of an enterprise audit or regulatory compliance procedures, respectively.

In various embodiments, an apparatus to implement out-of-band change detection may comprise a change control subsystem adapted to identify one or more out-of-band changes of a data processing device of a data processing environment. In various embodiments, an apparatus to implement out-of-band change detection may comprise an audit subsystem coupled to the change control subsystem to provide an audit trail of events and/or users associated with the change. In various embodiments, each subsystem may include one or more modules adapted to implement their respective functions. In some embodiments, the audit subsystem may include a response definition module adapted to facilitate definition of one or more responses to the one or more detected out-of-band changes. In some embodiments, the audit subsystem may additionally or alternatively include other modules.

Figure 4:
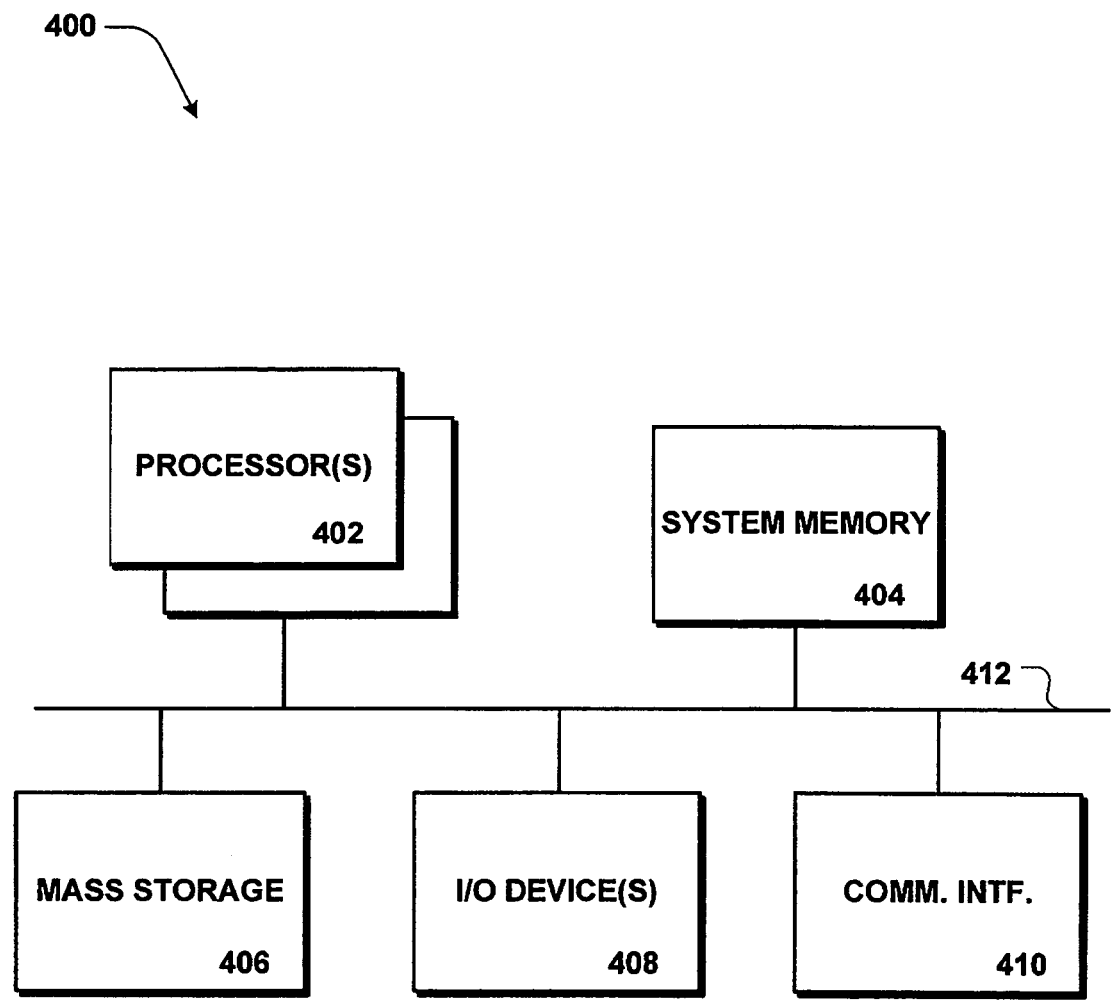
FIG. 4 illustrates an example computer system suitable for use in association with out-of-band change detection, in accordance with various embodiments of this invention.

FIG. 4 illustrates an example computer system suitable for use in association with out-of-band change detection, in accordance with various embodiments of this invention. As shown, computer system 400 may include one or more processors 402 and may include system memory 404. Additionally, computer system 400 may include mass storage 406 in the form of one or more devices (such as diskette, hard drive, CDROM and so forth), input/output devices 408 (such as keyboard, cursor control and so forth) and communication interfaces 410 (such as network interface cards, modems and so forth). The elements may be coupled to each other via system bus 412, which may represent one or more buses. In the case where system bus 412 represents multiple buses, the multiple buses may be bridged by one or more bus bridges (not shown).

These elements each perform their conventional functions known in the art. In various embodiments, communication interfaces 410 may facilitate coupling of computing system 400 to a network, though which computing system 400 may be coupled to data processing device 102 of FIG. 1 and so forth, as necessary. In various embodiments, computing system 400 may at least be partially incorporated in a data processing device, such as data processing device 102 of FIG. 1. System memory 404 and mass storage 406 may be employed to store a working copy and a permanent copy of the programming instructions implementing various aspects of the one or more earlier described modules of the present invention. The permanent copy of the programming instructions may be loaded into mass storage 406 in the factory or in the field, through a distribution medium (not shown), or through communication interface 410 from, for example, a distribution server (not shown). The constitution of these elements 402-412 are known, and accordingly will not be further described. In alternate embodiments, part or all of the one or more modules may be implemented in hardware, for example, using one or more Application Specific Integrated Circuits (ASICs) instead.

Thus, it can be seen from the above description, an automated method for facilitating management of a data processing environment is described. In various embodiments, the method may include facilitating creation of a first memorialization, in digital form, of one or more changes detected on a data processing device of the data processing environment. In various embodiments, the method may further included facilitating comparison of the first memorialization to a second memorialization of one or more in-band changes that should have been made to the data processing device to facilitate detection of one or more out-of-band changes to the data processing device. Other embodiments of the present invention may include, but are not limited to, apparatus adapted to facilitate practice of the above-described method. While the present invention has been described in terms of the foregoing embodiments, those skilled in the art will recognize that the invention is not limited to the embodiments described. Other embodiments may be practiced with modification and alteration within the spirit and scope of the appended claims. Accordingly, the description is to be regarded as illustrative instead of restrictive.

What is claimed is:

1. An automated method for facilitating management of a data processing environment comprising:
   creating, by a computer system, a first digital record of one or more changes detected on a data processing device of the data processing environment;
   comparing, by the computer system, the first digital record to a second digital record of one or more in-band changes that were intended to have been made to the data processing device, the in-band changes comprising changes which were known by a change agent; and
   detecting, by the computer system, one or more out-of-band changes to the data processing device which were not known by the change agent, the detecting based at least in part on the comparing the first and second digital records.

2. The method of claim 1, wherein said detecting one or more out-of-band changes comprises determining a subset of changes of the first digital record not included in the second digital record.

3. The method of claim 1, wherein said creating comprises:
automatically comparing a first state of the data processing device to a second state of the data processing device; and
creating a first file of first one or more records of the one or more detected changes to the data processing device.

4. The method of claim 3, wherein the second state is a current baseline state of the data processing device, and the method further comprises obtaining the first state of the data processing device.

5. The method of claim 3, wherein the second digital record comprises a second file of second one or more records of the one or more in-band changes that were intended to have been made to the data processing device, and said comparing the first digital record to the second digital record comprises automatically comparing the first file of first one or more records to the second file of second one or more records.

6. The method of claim 1, wherein said detecting comprises correlating a first change to a software of the data processing device in the first digital record to one of the one or more in-band changes in the second digital record, the second digital record having been created by a vendor of the software.

7. The method of claim 1, wherein said detecting comprises correlating a first change to data of the data processing device in the first digital record to one of the one or more in-band changes in the second digital record, the second digital record having been created by a vendor owner of the data.

8. The method of claim 1, wherein the method further comprises defining, in digital form, one or more responses to the one or more detected out-of-band changes.

9. The method of claim 8, wherein the one or more responses include an automatic remediation or alert response to at least one of the one or more detected out-of-band changes.

10. The method of claim 8, wherein the one or more responses include a no-action automatic approval response to at least one of the one or more detected out-of-band changes.

11. The method of claim 1, wherein said comparing comprises determining whether all of the in-band changes have been made to the data processing device.

12. The method of claim 11, wherein the method further comprises updating a baseline state of the data processing device to include in-band changes that indeed have been made to the data processing device.

13. The method of claim 1, wherein the change agent comprises a software distribution or updating agent.

14. The method of claim 1, where the change agent comprises a data change agent.

15. The method of claim 1, where the change agent comprises an access rights management agent.

16. The method of claim 1, wherein the creating and the comparing are first performed at a first point in time, and the method further comprises repeating the creating and the comparing at least once, at a second later point in time.

17. The method of claim 16, further comprising scheduling the repeating of the creating and the comparing at the second later point in time.

18. The method of claim 1, wherein the data processing device is a device selected from the group consisting of a networking device, a server, a desktop computer, a laptop computer, a tablet computer, a personal digital assistant, a cellular phone, a set top box, and a media player.

19. The method of claim 1, further comprising using the detected one or more out-of-band changes to maintain or demonstrate control of an enterprise's information technology infrastructure.

20. The method of claim 1, further comprising using the detected one or more out-of-band changes to maintain or demonstrate control of an enterprise's financial systems or data.

21. The method of claim 1, further comprising using the detected one or more out-of-band changes to maintain or demonstrate control of an enterprise's business processes.

22. The method of claim 1, further comprising using the detected one or more out-of-band changes to audit an enterprise to audit an enterprise.

23. The method of claim 22, wherein using the detected one or more out-of-band changes to audit an enterprise comprises providing an audit trail for an audit.

24. The method of claim 1, using the detected one or more out-of-band changes to facilitate compliance with governmental laws/regulations regarding establishment and maintenance of an internal control structure and/or procedures for financial reporting.

25. An apparatus Comprising:
a storage device having stored therein instructions that, when executed on a computer processor, cause the processor to perform a method comprising:
creating a first digital record of one or more changes detected on a data processing device; and
comparing the first digital record to a second digital record of one or more in-band changes that were intended to have been made to the data processing device, the in-band changes comprising changes which were known by a change agent;
detecting one or more out-of-band changes to the data processing device which were not known by the change agent, the detecting based at least in part on the comparing the first and second digital records.

26. The apparatus of claim 25, wherein the method further comprises determining whether any of the detected changes of the first digital record is not included in the second digital record.

27. The apparatus of claim 25, wherein the method further comprises:
comparing a first state of the data processing device to a second state of the data processing device; and
creating a first file of first one or more records of the application of the first one or more changes to the data processing device.

28. The apparatus of claim 27, wherein the second digital record comprises a second file of second one or more records of the one or more in-band changes that were intended to have been made to the data processing device, and wherein to the method further comprises automatically comparing the first file of first one or more records to the second file of second one or more records.

29. The apparatus of claim 27, wherein the method further comprises obtaining the first and/or second state of the data processing device.

30. The apparatus of claim 29, wherein the method further comprises obtaining the first state of the data processing device using a client portion downloadable onto the data processing device.

31. The apparatus of claim 25, wherein the method further comprises defining one or more responses to the one or more detected out-of-band changes.

32. The apparatus of claim 31, wherein the one or more responses include an automatic remediation or alert response to at least one of the one or more detected out-of-band changes.

33. The apparatus of claim 31, wherein the one or more responses include a no-action automatic approval response to at least one of the one or more detected out-of-band changes.

34. The apparatus of claim 25, wherein the method further comprises determining whether all of the in-band changes have been made to the data processing device.

35. The apparatus of claim 34, wherein the method further comprises updating a baseline state of the data processing device to include in-band changes that have been made.

36. The apparatus of claim 25, wherein the apparatus comprises one or more servers to store and/or execute the instructions.

37. The apparatus of claim 25, wherein the method further comprises using the detected one or more out-of-band changes to maintain or demonstrate control of one or more selected from the group consisting of an enterprise's information technology infrastructure, an enterprise's financial systems, an enterprise's financial data, and an enterprise's business processes.

* * * * *